US012780157B2

(12) United States Patent
Hollowell et al.

(10) Patent No.: US 12,780,157 B2
(45) Date of Patent: Nov. 3, 2026

(54) SYSTEM TO MITIGATE DYNAMIC TRACTION EVENTS IN A VEHICLE

(71) Applicant: FCA US LLC, Auburn Hills, MI (US)

(72) Inventors: James R Hollowell, Auburn Hills, MI (US); Zachary C Rogalski, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 45 days.

(21) Appl. No.: 18/931,157

(22) Filed: Oct. 30, 2024

(65) Prior Publication Data

US 2026/0116358 A1 Apr. 30, 2026

(51) Int. Cl.
*B60T 8/175* (2006.01)
*B60K 28/16* (2006.01)
*B60T 8/1755* (2006.01)

(52) U.S. Cl.
CPC .............. *B60T 8/175* (2013.01); *B60K 28/16* (2013.01); *B60T 8/17551* (2013.01)

(58) Field of Classification Search
CPC .... B60T 8/175; B60T 8/17551; B60T 8/4847; B60T 8/4275; B60T 8/5037; B60W 30/20; B60W 2520/28; B60K 28/16
See application file for complete search history.

(56) References Cited

U.S. PATENT DOCUMENTS

| | | | | |
|---|---|---|---|---|
| 5,511,865 A * | 4/1996 | Howell | B60T 8/175 | 303/177 |
| 6,401,853 B1 * | 6/2002 | Turski | F02P 5/1504 | 180/197 |
| 2004/0015279 A1 * | 1/2004 | Barron | B60G 17/08 | 701/37 |
| 2009/0107747 A1 * | 4/2009 | Luehrsen | B60T 8/175 | 180/197 |
| 2012/0303236 A1 * | 11/2012 | Andonian | B60T 8/175 | 701/83 |
| 2019/0001943 A1 * | 1/2019 | Ying | B60T 8/17555 | |

* cited by examiner

*Primary Examiner* — George C Jin
(74) *Attorney, Agent, or Firm* — Jeremy J. Klobucar

(57) ABSTRACT

A method for mitigating dynamic traction events in a vehicle includes detecting a wheel speed increase indicative of a wheel slip event, determining a frequency of a rate of change of the wheel speed during the wheel slip event, comparing the frequency to a threshold, and changing a traction control parameter when the frequency satisfies the threshold. In at least some implementations, the traction control parameter is a setting of a traction control system relating to one or both of throttle reduction and braking.

20 Claims, 2 Drawing Sheets

SYSTEM TO MITIGATE DYNAMIC TRACTION EVENTS IN A VEHICLE

FIELD

The present disclosure relates to a system for mitigating dynamic traction events, like wheel hop, in a vehicle.

BACKGROUND

During acceleration, one or more vehicle wheels can be driven by a torque that causes the wheel(s) to lose traction and break free from the ground. The wheel may leave the ground or be subject to less contact with the ground, in a so-called wheel hop event. When the wheel reengages the ground, significant forces and loads are applied to vehicle components including powertrain, drivetrain and suspension components. Multiple wheel hops rapidly occur during a wheel hop event, with each resulting in significant forces and component loads.

SUMMARY

In at least some implementations, a method for mitigating dynamic traction events in a vehicle includes detecting a wheel speed increase indicative of a wheel slip event, determining a frequency of a rate of change of the wheel speed during the wheel slip event, comparing the frequency to a threshold, and changing a traction control parameter when the frequency satisfies the threshold. In at least some implementations, the traction control parameter is a setting of a traction control system relating to one or both of throttle reduction and braking.

In at least some implementations, a positive vehicle acceleration is determined before determining the frequency, and wherein the traction control parameter is changed only when a positive vehicle acceleration has been determined. In at least some implementations, the positive vehicle acceleration is determined by detecting an increase in a torque output of a prime mover of the vehicle, or by detecting an increase in wheel speed.

In at least some implementations, the traction control parameter relates to a torque applied to a driven wheel, and changing the traction control parameter includes reducing a magnitude of torque applied to the driven wheel.

In at least some implementations, the traction control parameter relates to a braking force applied to a driven wheel, and wherein increasing the traction control parameter includes increasing a magnitude of the braking force.

In at least some implementations, the vehicle includes multiple traction control settings for a traction control system, and changing the traction control parameter includes changing the traction control setting to a new one of the multiple traction control settings with increased traction control. In at least some implementations, the new setting is maintained until a user manually changes the traction control setting to a different one of the multiple traction control settings. In at least some implementations, the multiple traction control settings each include a different magnitude for one or both of a braking force and an acceleration control, and, in at least some implementations, the braking force is applied to the wheel for which the wheel slip event is determined.

In at least some implementations, the threshold is a predetermined range of frequencies associated with a wheel hop event of the vehicle.

In at least some implementations, a method for mitigating dynamic traction events in a vehicle, includes detecting a wheel speed increase indicative of a wheel slip event, determining a frequency of a rate of change of the wheel speed during the wheel slip event, determining the occurrence of a wheel hop event based at least in part on the frequency, and increasing a traction control parameter that reduces wheel spin.

In at least some implementations, a new traction control parameter setting is maintained until a user manually changes the traction control setting to a different one of the multiple traction control settings.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
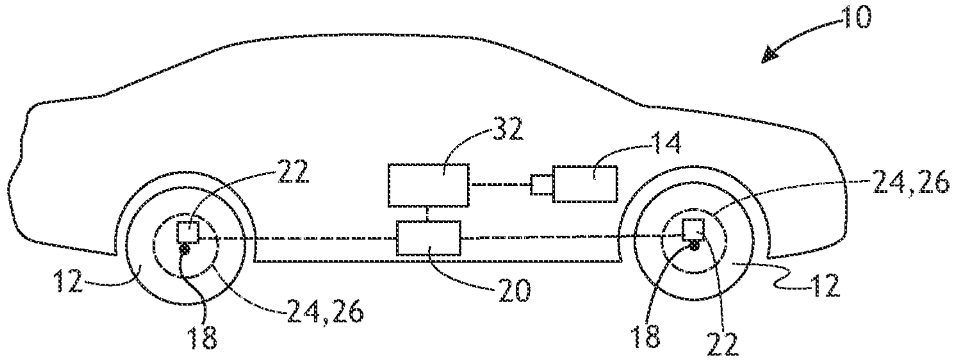
FIG. 1 is a diagrammatic view of a vehicle.

Referring in more detail to the drawings, FIG. 1 illustrates a vehicle 10 that includes multiple wheels 12, and a propulsion system 14 that provides torque to the wheels 12 to rotate the wheels 12 about an axis of rotation 18 and propel the vehicle 10. The propulsion system 14 may include a combustion engine, electric motor(s), or both. The vehicle 10 may also include a brake system 20 that includes multiple brake assemblies 22 that are actuated to decelerate the vehicle 10. The wheels 12 are each mounted to the vehicle 10 by a suspension system 24 that includes wheel mounting assemblies 26 for each wheel 12, and the suspension system 24 may be of any desired type or types (e.g. independent suspension, solid-axles, etc). Vehicle speed and accelerations may be determined by one or more wheel speed sensors 28 (FIG. 2) and accelerometers 30. These sensors 28, 30, among other things, may be coupled with a controller or control system 32 (e.g., an engine control module, brake control module, and/or others). The control system 32 and sensors 28, 30 may be used in control of one or move vehicle functions or systems, like a traction control system 34 (TCS), an anti-lock brake system 36 (ABS), an electronic stability control system 38 (ESC), and the like.

The control system 32 may include memory 40 for storing data from the one or more sensors 28, 30, one or more instructions or programs 42, and one or more processors 44 arranged to execute the programs or instructions. In order to perform the functions and desired processing set forth herein, as well as the computations therefore, the control system 32 may include, but not be limited to, a processor(s), computer(s), DSP(s), memory 40, storage, register(s), timing, interrupt(s), communication interface(s), and input/output signal interfaces, and the like, as well as combinations comprising at least one of the foregoing. For example, control system 32 may include input signal processing and filtering to enable accurate sampling and conversion or acquisitions of such signals from communications interfaces and sensors 28, 30 among others. As used herein the terms controller or control system 32 may refer to one or more processing circuits such as an application specific integrated circuit (ASIC), an electronic circuit, a processor (shared, dedicated, or group) and memory 40 that executes one or more software or firmware programs 42, a combinational logic circuit, and/or other suitable components that provide the described functionality.

The term “memory” 40 or “storage” as used herein can include computer readable memory, and may be volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory 40 can store an operating system and/or instructions/programs 42 executable by a processor 44 or controller or the like to enable control or allocate resources of a computing device.

Figure 2:
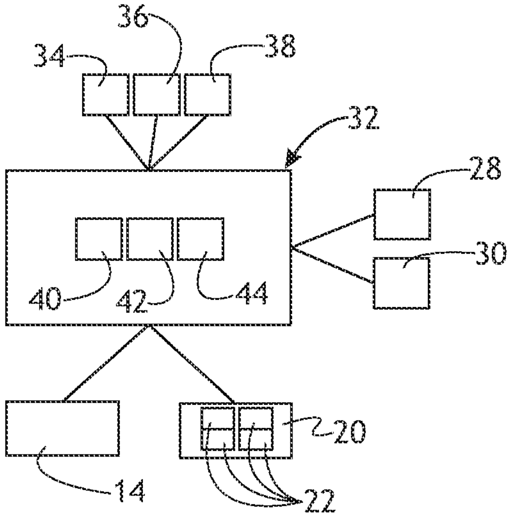
FIG. 2 is a schematic view of a control system of the vehicle.

As shown in FIG. 2, to permit measurement of the rotational speed of the wheels 12, the wheel speed sensor 28 may be associated with one of the wheels 12 to provide an output to the control system 32 that is indicative of the rotation of the wheel 12. The wheel speed sensor 28 may measure rotational speed, acceleration, or both. A separate wheel speed sensor 28 may be associated with each wheel 12. Further, acceleration may be determined by the derivative of rotary speed output(s) from the sensors 28. By way of a non-limiting example, the wheel speed sensor 28 may be a hall effect sensor with a magnet being rotated with the wheel 12 or spindle and with a sensing element used to detect the magnet as it rotates by the sensing element. Of course, other types of rotational speed sensors 28 may be used.

Additionally, acceleration may be measured using an accelerometer 30 which measures gravitational forces (i.e., g-forces) in forward and reverse directions. In at least one embodiment, the accelerometer 30 may be a multi-axis accelerometer 30 which provides simultaneous measurement of accelerations in three perpendicular axes, for example. The accelerometer 30 may measure normal acceleration which arises when torque is transferred from the propulsion system 14 to the wheels 12 and may also detect decelerating braking forces that arise when the brakes of the vehicle 10 are applied or during engine braking, for example.

One or more systems of vehicle 10 may use the wheel speed and vehicle acceleration data from the wheel speed sensor 28 and accelerometer 30 during operation or during travel of the vehicle 10. For instance, the TCS 34, ABS 36 and ESC system 38, on-board diagnostic monitors (OBD), and/or autonomous vehicle systems (AVS) or Advanced Driver Assistance Systems (ADAS) may utilize some or all of the data from the wheel speed sensor 28 and/or the accelerometer 30. The TCS 34, ABS 36 and ESC system 38 may operate in known manners to selectively control a magnitude of torque provided by the propulsion system 14 to one or more wheels 12 and/or a braking force that is applied to one or more wheels 12 to reduce or eliminate wheel spin or slippage and improve the control and handling of the vehicle 10 over a wide range of driving conditions. In this regard, a separate brake assembly 22 may be associated with each wheel 12 and the brake assemblies 22 may be separately actuated to selectively provide braking to individual wheels. In this regard, the control system 32 is coupled to the brake assemblies 22 to actuate the brake assemblies in accordance with the operation of the vehicle control systems (e.g. TCS 34, ABS 36 and ESC system 38).

The vehicle 10 may include multiple selectable driving modes by which a user can choose different performance or comfort settings for vehicle operation. The performance or comfort settings may vary a throttle response of the vehicle 10 (e.g. rate of torque output to the wheels 12 from the propulsion system 14), a vehicle suspension system 24 (e.g. with a suspension that enables adjustable stiffness), and the operating parameters for one or more of the TCS 34, ABS 36 and ESC system 38. For example, the vehicle 10 may include all or a combination of different driving modes such as economy, comfort, snow, normal, sport and track. Each driving mode may differ from the other driving modes by one or more drive control settings or parameters. For example, the economy mode may have a reduced throttle response compared to the normal, sport and track modes which may, in turn, have increasingly greater throttle responses to enable increasing acceleration rates of the vehicle 10. Further, the TCS 34, ABS 36 and ESC system 38 may be greatly reduced or turned off in track mode, which is designed for maximum vehicle performance with minimal electronic, safety or stability systems interference with vehicle operation. Conversely, normal, snow and economy modes may have TCS 34, ABS 36 and ESC system 38 settings selected to provide increased electronic, safety or stability system operation to better ensure stable and more controlled vehicle operation, as achieving maximum vehicle performance is not the goal of vehicle operation in these driving modes.

In addition to the driving modes, the vehicle 10 may include inputs or interfaces by which a driver can independently adjust one or more of the system settings, such as but not limited to, throttle response, TCS 34, ABS 36 and ESC 38 settings. For example, a vehicle 10 may include a TCS 34 on/off switch that a user may actuate to selectively turn the TCS 34 on or off. A driver may wish to turn off the traction control system 34 to enable vehicle movement on reduced friction surfaces like snow or ice or sand, where the TCS 34, if on, would reduce or cut-off the vehicle throttle response to reduce wheel spin and can make it difficult to accelerate from a stopped state.

Beyond just on and off states, the vehicle 10 can enable different levels or magnitudes of response from the TCS 34. The different levels of response may have different throttle response rates/levels and/or different wheel braking magnitudes or thresholds (e.g. wheel spin or slip amount or rate that is required to cause actuation of the wheel braking function of the TCS 34). And such on and off, or multiple levels of settings may also be provided for the other vehicle drive control systems, like ABS 36 and ESC 38. In these systems, the threshold vehicle accelerations and/or wheel spin or slip rates or amounts that are required for the system to be actuated, as well as the magnitude of braking force or throttle response reduction that occurs during actuation, can be adjusted in at least some implementations. The systems may have maximum levels, which provide a maximum amount of system control, meaning a maximum throttle reduction and/or brake response with thresholds set so that these systems are actuated with less wheel spin or slip, and/or at lower accelerations.

In at least some implementations, a dynamic traction event includes moments when one or more wheels 12 are driven at a rate or torque that causes one or more wheels 12 to lose traction and slip relative to the ground. That is, the driving/motive force (e.g. to cause longitudinal/forward acceleration) on the wheel 12 exceeds the force provided by the friction between the ground and a contact patch of a tire, which is the portion of the tire engaged with the ground at any moment, is exceeded. This is a loss of traction or wheel slip event during which, rather than roll along the ground, a wheel spins relative to the ground. Similarly, lateral accelerations alone, or in combination with longitudinal accelerations, may cause a wheel 12 to slip or slide relative to the ground (i.e. when the friction force is overcome). The magnitude of accelerations or other threshold(s) set to cause actuation of a vehicle system may be less than is required to cause a wheel slip event, or may be set to require at least some wheel slip with the magnitude of such wheel slip being adjustable (e.g. the thresholds can be different in different settings or driving modes).

When the torque applied to one or more driven wheels 12 of the vehicle exceeds the tire friction, such as when accelerating from a standstill or stopped state, one or more of the driven wheel(s) 12 may break free and slip along the ground. Some such dynamic traction events cause a driven wheel 12 to leave the ground (e.g. move perpendicular to the axis 18 and ground, or become unloaded or in less contact with the ground) whereupon the wheel spin rate increases due to the reduction in friction on the wheel 12. This is often called "wheel hop" and several wheel hops may occur during such an event. During the acceleration event, suspension components like bushings, springs and the like are loaded and when a wheel 12 breaks free of the ground (i.e. wheel hop) the load on the components is released, then the load is very quickly applied again when the wheel 12 re-engages the ground. This results in significant impact/impulse forces that is jarring to passengers and can damage vehicle components such as drivetrain and suspension components. While described with regard to forward acceleration, wheel hop can also happen upon deceleration, during which there can be rapid loss/regain of traction.

Additionally, when a wheel hops, the wheel 12 may be driven at a faster rotational rate due to the reduced friction acting on the wheel 12 that is not in contact or is in less contact with the ground. When the faster spinning wheel 12 reengages with the ground, there may be a subsequent loss of traction/wheel slip event and a subsequent wheel hop. Thus, wheel hop involves intermittent and rapid loss of and regaining of traction, with significant forces applied to vehicle components during the event.

Some traction control systems are set to greatly reduce torque to the wheels 12 when wheel slip is detected, by reducing the throttle response and thus, the torque output of the propulsion system 14. However, when a lesser traction control setting or level is in use, wheel hop events are more likely. This may be true even with vehicles not considered to be high torque or high-performance vehicles. For example, a front-wheel drive minivan can experience wheel hop when accelerating up an incline as the vehicle weight is shifted more toward the rear of the vehicle 10, away from the driven wheels 12 providing less downward force on the driven wheels 12. A lower performance vehicle can also experience wheel hop when the vehicle 10 is accelerating on a lower friction surface, like when water, dirt or sand is on a paved surface on which the vehicle 10 is located.

Figure 3:
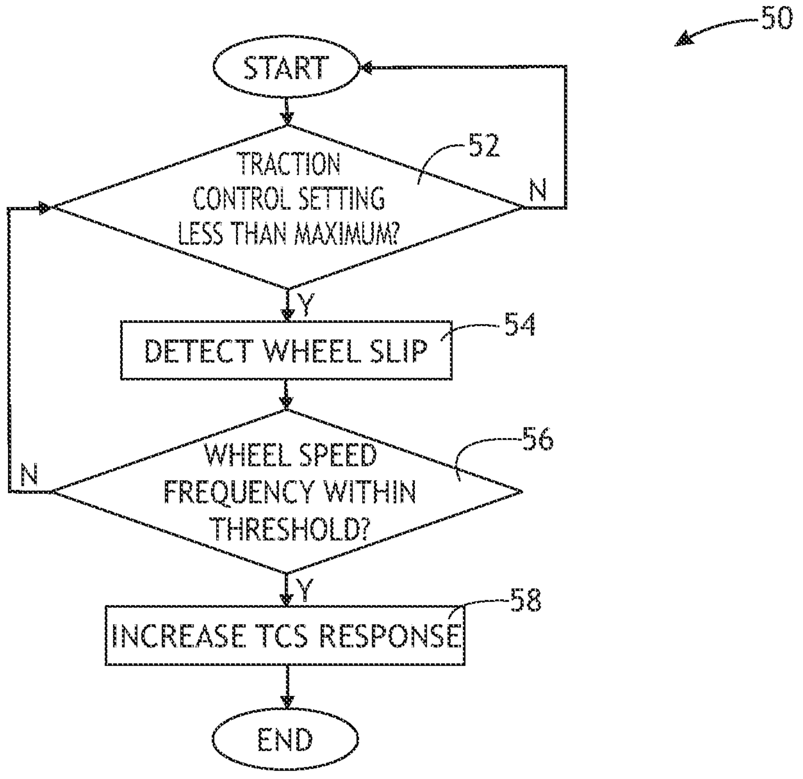
FIG. 3 is a flowchart of a method of mitigating a dynamic traction event in the vehicle.

FIG. 3 illustrates a flowchart of a method 50 for mitigating a wheel hop event. In step 52, the traction control setting may be determined and then a check run to see if the traction control setting is at a maximum level or not. The traction control setting may be one or both of a throttle response reduction magnitude or level and a wheel braking magnitude or level. If the traction control setting(s) is/are at a maximum level, then the method may end, or loop back to the start, in at least some implementations. In this example, the method seeks to determine if a traction control setting should be increased, so if an increase is not possible, the method is not needed. If the traction control settings is/are not at the highest or maximum level, then the method may continue to step 54.

In step 54, wheel speed is monitored and a wheel slip event is detected by wheel speed increase at a rate above a threshold. The threshold could be variable, for example to vary at different vehicle speeds, if desired. For example, the wheel speed can be measured at intervals, which may be the response or cycle time of the wheel speed sensors 28 or a longer interval, as desired. By way of a non-limiting example, a wheel speed differential can be computed between two consecutive sensor responses (e.g. sensor cycles) received by the control system 32, or between a series of more than two sensor cycles. If the wheel speed increases at a rate that is beyond the threshold, this indicates a loss of traction or wheel slip event, and the method proceeds to step 56.

Figure 4:
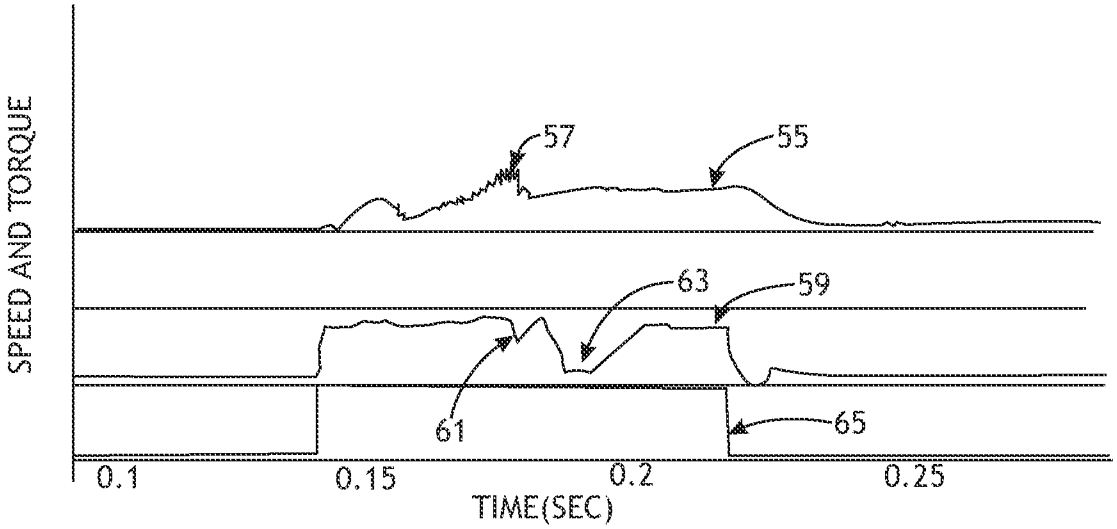
FIG. 4 is a graph showing wheel speeds and torque magnitude during an acceleration and wheel hop event.

In step 56, the frequency of wheel speed changes is determined during the wheel slip event. As shown in FIG. 4, during a wheel hop event, the wheel speed of a wheel 12 experiencing the wheel hop increases rapidly when the wheel hops and decreases rapidly when the wheel 12 engages the ground. This is shown by line 55 which is a graph of wheel speed of a driven wheel over time, and a wheel slip/wheel hop event is shown at 57. The frequency of this wheel speed increase and decrease cycle during a wheel hop is consistent and falls within a range of frequencies for a given vehicle 10 and may be pre-determined. The frequency may depend on a number of factors such as, but not limited to, vehicle weight and weight distribution, and suspension component attributes like stiffness and spring rates. Thus, after a wheel slip event is detected, the system can determine the frequency of wheel speed changes to determine if a wheel hop occurred or if there was a different loss of traction event without a wheel hop. To do this, a threshold for wheel hop frequency may be set, which may be an upper or lower limit, or a defined range of frequencies, for example, between 2 Hz and 10 Hz, and in some vehicles between 2 Hz and 6 Hz, by way of non-limiting examples of frequency ranges. If the frequency threshold indicative of wheel hop is not determined to have been met in step 56, the method may return to step 52 to ensure the traction control setting is not a a maximum value already, and then to detect in step 54 a subsequent wheel slip event. If the frequency threshold is determined to have been met in step 56, the method continues to step 58.

In step 58, a traction control response is increased. Increasing the traction control response may include increasing a magnitude of throttle/acceleration reduction or a wheel braking force, or both. The increase may be from one predetermined setting of the TCS 34 to a second predetermined setting, or to specific values or levels of increase. In at least some implementations, to ensure that a subsequent wheel hop event does not occur after a detected or determined wheel hop, the traction control response may be set to a maximum response level in step 58.

In the example shown in FIG. 4, this is shown by line 59 which is a plot of torque output and shows a first level reduction at 61 upon the wheel hop event 57 occurring and a larger, second level reduction at 63 after the traction control setting is increased. User demanded torque (e.g. the torque requested by the user actuating an accelerator input/pedal) is shown by line 65 and the high torque demand remains throughout the time of reduced torque outputs.

Absent intervention by changing the TCS 34 response, wheel hop events typically include multiple wheel hops, whereas, as shown in FIG. 4, a single wheel hop event occurred and subsequent events were avoided by the increased traction control response. Increasing the traction control response can reduce the torque provided to a driven and hopping wheel 12, and/or provide braking to the wheel 12, to reduce the wheel speed and increase the likelihood that the wheel 12 will thereafter regain traction and not slip relative to the ground, thereby terminating the wheel hop event. This minimizes the wheel hop event and reduces forces on the vehicle components and that are noticed by vehicle passengers.

The method may include additional steps. For example, after step 58, the method may include steps such as notifying the driver of the wheel hop event and/or of the increased traction control setting. The driver can be queried as to whether they would like to return the traction control setting to the lower level in use prior to the wheel hop event. The method may set a timer and automatically reset the traction control setting after a certain duration of time, or the method may end and leave the traction control setting at the higher level implemented in step 58. At least in examples in which the traction control setting is increased but not maximized in step 58, the method may loop back to step 56 to determine if a subsequent wheel hop occurs, and if so, the method may return to step 58 to again increase the traction control setting. Further, in at least some implementations, the method may be run only when a positive forward acceleration is detected, such as may be done by detecting an increase in a torque output of a prime mover of the vehicle, or via an accelerometer 30.

What is claimed is:

1. A method for mitigating dynamic traction events in a vehicle, comprising:

detecting a wheel speed increase indicative of a wheel slip event;

determining a frequency of a rate of change of the wheel speed during the wheel slip event;

comparing the frequency to a threshold; and changing a traction control parameter when the frequency satisfies the threshold, wherein the vehicle includes multiple traction control settings for a traction control system, and wherein changing the traction control parameter is accomplished by changing the traction control setting to a new one of the multiple traction control settings with increased traction control when the frequency satisfies the threshold and when the traction control setting is not already at a maximum value.

2. The method of claim 1 which also includes determining a positive vehicle acceleration before determining the frequency, and wherein the traction control parameter is changed only when a positive vehicle acceleration has been determined.

3. The method of claim 2 wherein the positive vehicle acceleration is determined by detecting an increase in a torque output of a prime mover of the vehicle.

4. The method of claim 2 wherein the positive vehicle acceleration is determined by detecting an increase in wheel speed.

5. The method of claim 1 wherein the traction control parameter relates to a torque applied to a driven wheel, and wherein changing the traction control parameter includes reducing a magnitude of torque applied to the driven wheel.

6. The method of claim 1 wherein the traction control parameter relates to a braking force applied to a driven wheel, and wherein increasing the traction control parameter includes increasing a magnitude of the braking force.

7. The method of claim 1 wherein the new one of the multiple traction control settings is a setting providing a maximum traction control response level.

8. The method of claim 1 wherein the new setting is maintained until a user manually changes the traction control setting to a different one of the multiple traction control settings.

9. The method of claim 5 wherein the multiple traction control settings each include a different magnitude for one or both of a braking force and an acceleration control.

10. The method of claim 9 wherein the braking force is applied to the wheel for which the wheel slip event is determined.

11. The method of claim 1 wherein the threshold is a predetermined range of frequencies associated with a wheel hop event of the vehicle.

12. A method for mitigating dynamic traction events in a vehicle, comprising:

detecting a wheel speed increase indicative of a wheel slip event;

determining a frequency of a rate of change of the wheel speed during the wheel slip event;

determining the occurrence of a wheel hop event based at least in part on the frequency; and increasing a traction control parameter that reduces wheel spin, wherein the vehicle includes multiple traction control settings for a traction control system, and wherein increasing the traction control parameter is accomplished by changing the traction control setting to a new one of the multiple traction control settings with increased traction control when occurrence of a wheel hop event is determined.

13. The method of claim 1 wherein the multiple traction control settings are predetermined settings having differing and predetermined magnitudes of throttle response, or wheel braking force or both throttle response and wheel braking force, and wherein changing the traction control parameter is accomplished by changing from one predetermined setting to a second predetermined setting.

14. The method of claim 12 wherein the traction control parameter relates to a torque applied to a driven wheel, and wherein increasing the traction control parameter includes reducing a magnitude of torque applied to the driven wheel.

15. The method of claim 12 wherein the new one of the multiple traction control settings is a setting providing a maximum traction control response level.

16. The method of claim 12 wherein the new setting is maintained until a user manually changes the traction control setting to a different one of the multiple traction control settings.

17. The method of claim 12 wherein the multiple traction control settings each include a different magnitude for one or both of a braking force and an acceleration control.

18. The method of claim 17 wherein the braking force is applied to the wheel for which the wheel slip event is determined.

19. The method of claim 12 wherein the threshold is a predetermined range of frequencies associated with a wheel hop event of the vehicle.

20. The method of claim 12 wherein the multiple traction control settings are predetermined settings having differing and predetermined magnitudes of throttle response and wheel braking force, and wherein changing the traction control parameter is accomplished by changing from one predetermined setting to a second predetermined setting.

* * * * *